UNITED STATES PATENT OFFICE.

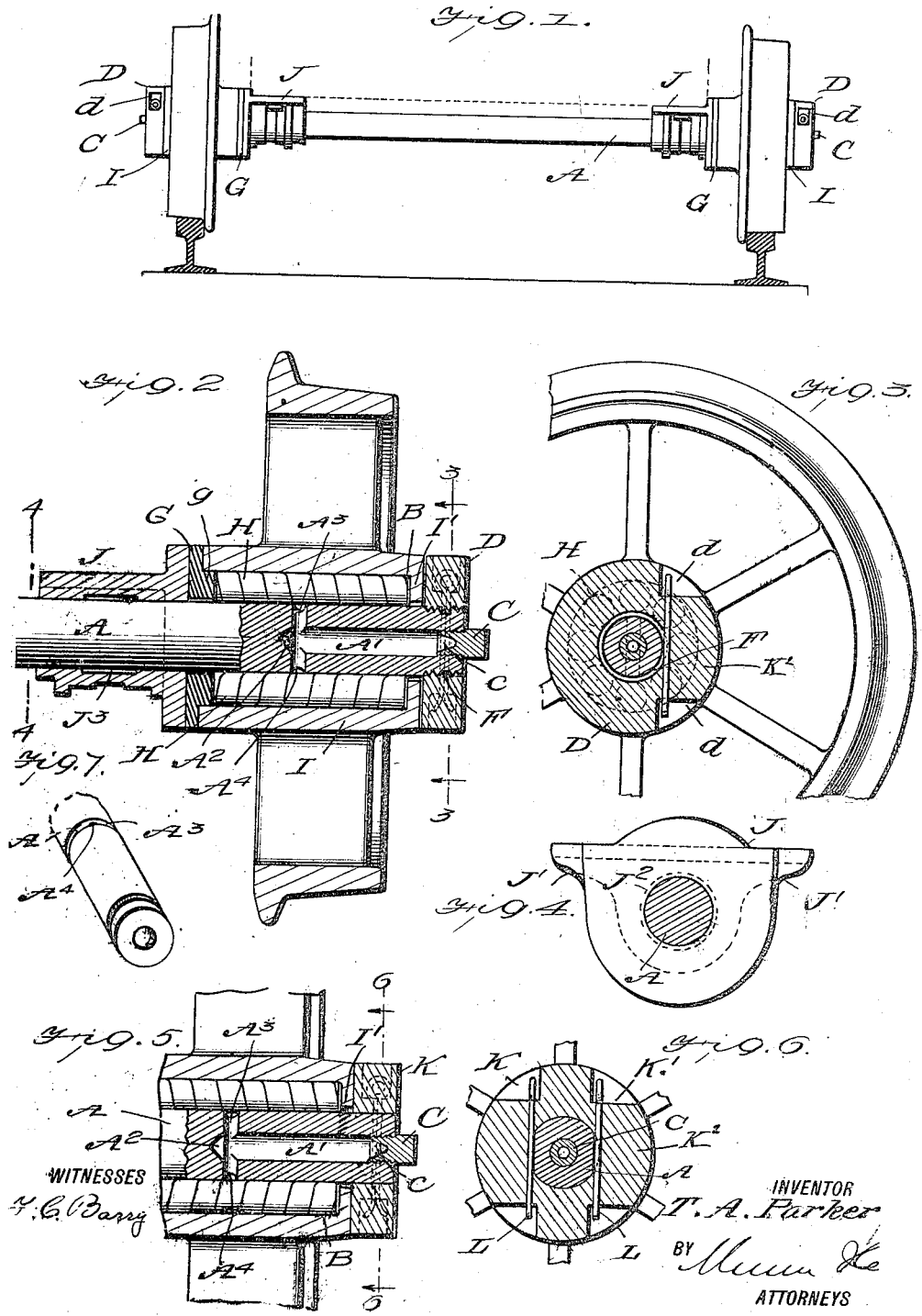

THATCHER A. PARKER, OF BRAZIL, INDIANA.

MINE-CAR WHEEL AND AXLE.

1,289,249.

Specification of Letters Patent.   Patented Dec. 31, 1918.

Application filed April 30, 1918.   Serial No. 231,638.

*To all whom it may concern:*

Be it known that I, THATCHER A. PARKER, a citizen of the United States, and a resident of Brazil, in the county of Clay and State of Indiana, have invented certain new and useful Improvements in Mine-Car Wheels and Axles, of which the following is a specification.

My invention relates to improvements in roller bearing mine car wheels and axles, and consists in certain novel features of construction and arrangement of parts as will be hereinafter described and pointed out in the claims.

An object of the invention is to provide a mine car wheel and axle assembly comprising a simple wheel consisting of few parts which may be readily secured in position upon the axle which is also of novel construction, in such manner as to retain a roller bearing assembly in position within a roller bearing chamber and to provide a smooth bearing surface both at the front and rear faces of the hub. Another object is to provide means whereby a smooth vertical bearing face is presented to the journal box, such means also serving to retain the roller bearing assembly and lubricant in its chamber. Another object is to provide novel means for holding the hub on the axle at its front end and to cause its rear face to coact with the journal box. Another object is to provide particular means for holding the front end of the hub against undue outward play on the axle. A further object is to provide particular means for introducing lubricant to the axle and thence to the roller bearing chamber.

In the drawing, Figure 1 is an elevation showing portion of parts as in use.

Fig. 2 is a vertical longitudinal section of a portion of same.

Fig. 3 is a transverse vertical section on line 3—3 of Fig. 2.

Fig. 4 is a front elevation of the journal box with the axle in section.

Fig. 5 is a vertical longitudinal section of my improvements showing another form of hub retaining means.

Fig. 6 is a transverse vertical section on line 6—6 of Fig. 5.

Fig. 7 is a fragmentary view showing the outside of the outer ends of the axle.

The axle or spindle A which is round and straight from end to end is the same at both ends. In each outer end is drilled axially a channel A′ a suitable distance, the inner end of said channel being cone-shaped as shown at A². A vertical channel A³ is drilled through the axle A just in advance of the cone-shaped end A² and merges at its ends into the circumferential groove A⁴ which opens into the roller bearing chamber B hereinafter described.

In the outer ends of the channel A′ a suitable thread is cut into which screws a plug C, the inner end of which has a tapering recess $c$. The outer ends of the axle are also externally threaded, and upon the ends are screwed the collars D held from unscrewing by a cotter pin E passing through the collar and an opening F cut in the axle eccentric to its axis. Where the cotter pin E passes through the collars, angular recesses $d$ are made to receive the ends of the pins E, where they are retained within the periphery of the collar, and thus prevented from contact with outside objects.

A metal washer G machined to a pressed fit is forced into the rear end of the hub so that the flange or shoulder G fits within the hub closing the rear end around the axle and retaining the roller bearing assembly H in place; this washer makes a tight and permanent joint, thereby holding lubricant in the chamber formed in the hub I by the integral front wall I′ which chamber surrounds the axle; and such washer also protects the rear end of the roller bearing which is of the Hyatt spiral roller type.

At J is shown the journal box which is secured to the bottom of the car and within which the axle revolves. This journal box is bolted through the horizontal lateral flanges J′; this box which is cast iron has a front flange J² having a smooth vertical face forming a shoulder for the rear face of the hub to come in contact with, the collar D forming an outside shoulder for the hub to contact with. The journal box is also provided with an internal groove J³ which entirely surrounds the axle which will aid in retaining lubricant to reduce friction on the axle within the journal box.

Another means of securing the wheel on the axle is shown in Figs. 5 and 6, and is used where the outer ends of the axle are left unthreaded and are smooth. In this form of device, the collar K has a smooth central bore fitted on the smooth ends of the axle and having the cut out portions or angular recesses K′ at each side of its center leaving projecting portions K² through which are passed the cotter pins L, the said pins passing through openings drilled through the projecting portions and coinciding with corresponding openings drilled in the axle eccentric to its axis.

By providing the cut outs or recess in the outside collars the cotter pins have both ends lying within said recesses and not projecting beyond the periphery of the collars cannot come in contact with other objects and be knocked out of place or broken.

As before stated, the hub of the wheel is bored out leaving an integral flange or shoulder I', at its front end and forming thereby a chamber to which the lubricant is conveyed, and also which constitutes the roller bearing chamber and permits the lubricant to get to the roller bearing; and, as the rear end of the chamber is closed by the flanged or shouldered washer forced by a pressed fit into the same, the roller bearing assembly is maintained in correct position at both its front and rear ends.

From the above it will be perceived an extremely simple and efficient mine car wheel and axle is provided, and one consisting of a few parts.

It will be noted that there is a slight space between the axle and the flange I' and washer D, which will permit some play incident to inequalities of the tracks.

I claim:—

1. In combination, an axle, a car wheel of that type the hub of which has an enlarged bore, and mounted on such axle, the rear open end of said enlarged bore closed by a cast iron washer, said washer having a circular horizontal flange projecting into the enlarged bore in pressed-fit relation, and a vertical flange abutting the rear end of the hub, said washer constituting both a closure for the bore and a bearing for a roller bearing assembly, a journal box supporting said axle and abutting the vertical flange of the aforesaid washer, and means for maintaining the hub on the outer end of the axle and against outward longitudinal movement thereon.

2. In combination an axle, a car wheel mounted therein, said wheel including a hub having a bearing at its rear against a journal box, and against which it is held, a collar mounted on the outer end of said axle at the front face of the hub, pins passing through said collar and engaging the axle eccentrically of its axis and locking the collar against rotation thereon.

3. In combination, an axle, a car wheel mounted thereon, a journal box supporting said axle, and abutting the rear face of the wheel, a collar detachably mounted on the outer end of the axle and holding the wheel to said journal box, said collar having cut out portions or recesses in its periphery, and pins passing through said collar at said cut out portions and engaging the axle eccentrically of its axis, the ends of said pins lying in said recesses and entirely within the periphery of the collar.

4. An axle for mine car wheels consisting of a cylindrical spindle having a drilled axial bore in each end, the inner ends of said bore being cone-shaped, a transverse channel intersecting said bore adjacent its inner end, a circumferential groove surrounding said axle at the ends of said transverse channel, the outer end of the bore internally threaded, a screw plug fitted in the threaded bore, said plug having a cone-shaped recess in its inner end, the outer end of the axle having a groove in its periphery eccentric to its axis, a collar removably mounted on the outer end of the axle and covering said peripheral groove, and means passing through the collar and engaging the peripheral groove to lock the collar to the axle.

5. In a car wheel of the type characterized by a hub having an enlarged bore constituting a lubricant chamber and roller bearing assembly chamber, the combination with the hub, of a washer having a circular horizontal flange projecting into the bore in pressed fit relation and a vertical flange abutting the rear face of the hub, said washer constituting a closure for the bore, a retaining means for the bearing assembly and a rear thrust bearing, and means retaining the hub on the axle against relative longitudinal movement.

THATCHER A. PARKER.

Witnesses:
E. J. BURNS,
A. R. SMITH.